Sept. 10, 1963 F. M. FORTE 3,103,337
PILOT OPERATED VALVE
Filed May 9, 1962
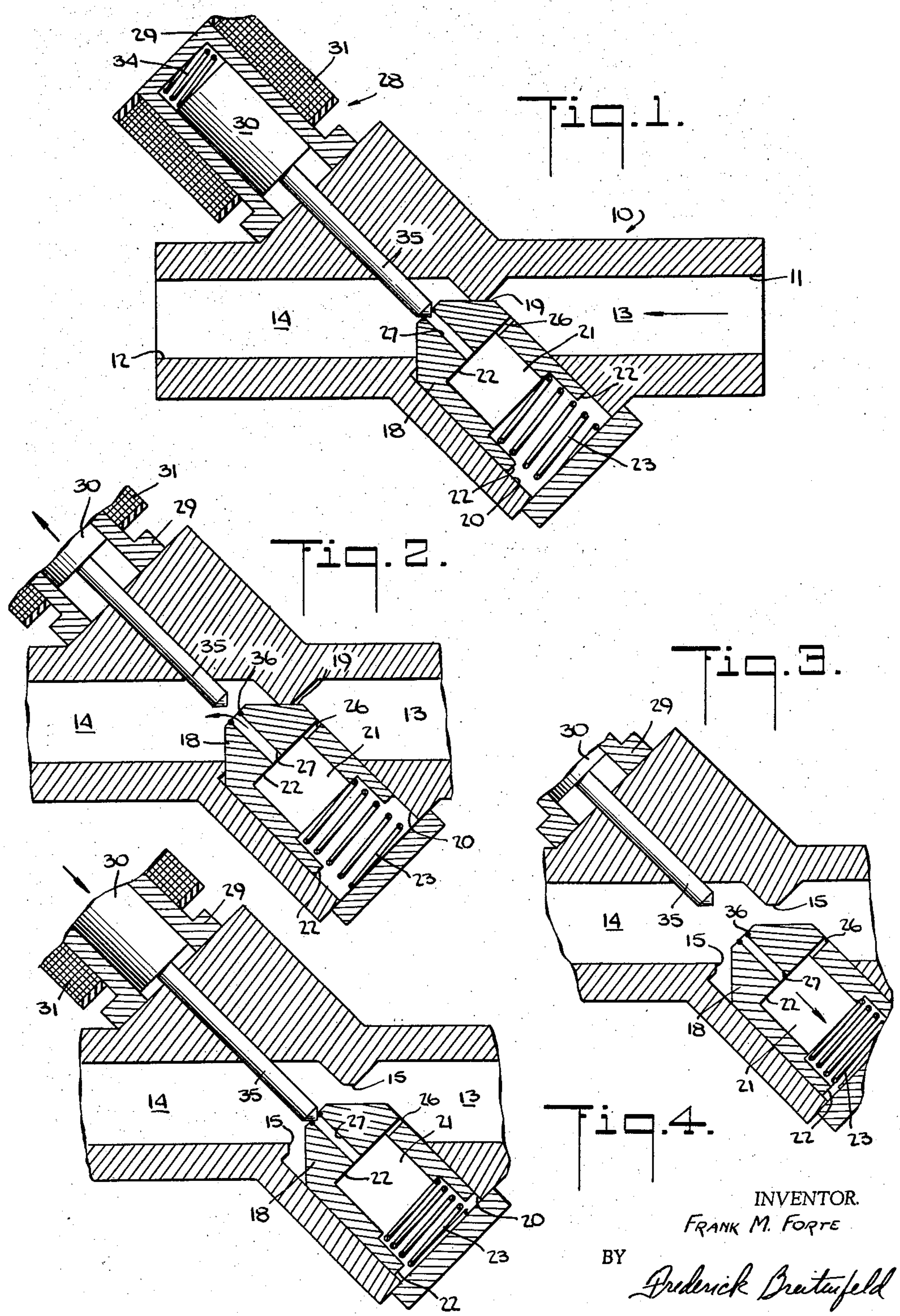
INVENTOR.
FRANK M. FORTE
BY Frederick Breitenfeld
ATTORNEY United States Patent Office 3,103,337

Patented Sept. 10, 1963

3,103,337

PILOT OPERATED VALVE

Frank M. Forte, Hanover, N.J., assignor to Automatic Switch Co., Florham Park, N.J., a corporation of New York Filed May 9, 1962, Ser. No. 193,484
2 Claims. (Cl. 251—30)

This invention relates generally to pilot-operated valves, and has particular reference to valves of the type wherein a pilot passageway is provided in a main valve element and a pilot valve element is arranged to prevent or permit flow through the pilot passageway to control the seating and unseating of the main valve element.

A valve of this kind comprises generally a valve body having an inlet or high pressure port, an outlet or low pressure port, and a valve seat between these ports. A main valve element, often in the form of a piston movable in a cylinder aligned with the axis of the valve seat, is mounted on the high pressure side of the valve seat and is adapted to seat against the valve seat and thus prevent fluid flow through the valve. Behind the piston is a chamber or cavity which communicates with the inlet port of the valve through a small bleed hole or leakage path. Thus, high pressure fluid from the inlet port is permitted to enter the chamber behind the piston and thereby urge the piston against the valve seat to close the valve. This action is opposed by the high pressure fluid acting on a narrow annular region at the front end of the valve piston which surrounds the valve seat, but since the area of this region is less than the area of the rear end of the piston subject to the fluid in the cavity the valve remains closed. In order to open the valve, the pressure in the cavity behind the piston must be relieved. This is accomplished by providing a pilot passageway in the piston, whose cross-sectional area is greater than the cross-sectional area of the bleed hole, through which the chamber communicates with the outlet port. A pilot valve element is also provided to control the fluid flow through the pilot passageway. Means such as a solenoid may be provided to operate the pilot valve element and when it is desired to open the valve, the solenoid is energized to cause the pilot valve element to open the pilot passageway. The high pressure fluid in the chamber thereupon rushes through the pilot passageway toward the outlet port thus reducing the pressure in the chamber and enabling the high pressure fluid acting on the annular region of the front end of the piston to lift the piston off the valve seat.

In conventional valves of the type just described, the pilot valve element is located behind the main valve element or piston and cooperates with the high pressure end of the pilot passageway. Consequently, the direction in which the pilot valve element moves to open the pilot passageway is the same as the direction in which the main valve element moves to open the valve. Therefore, the length of stroke of the solenoid controlling the pilot valve element must be greater than the distance moved by the main valve element between its seated and open positions. The stroke must be greater since the pilot passageway must remain open if the main valve is to remain open. Furthermore, since the solenoid is located directly behind the cavity behind the main valve element, means must be provided to shield the solenoid assembly from the high pressure fluid which accumulates in the cavity when the pilot valve and the main valve are closed.

It is a principal object of this invention to provide a pilot-operated valve of the type described wherein the extent of movement of the main valve element is independent of the stroke of the pilot valve element.

It is a further object of the invention to provide such a valve wherein the solenoid assembly is isolated from the fluid being controlled when the valve is closed.

It is another object of the invention to provide a valve of the character described wherein a solenoid of relatively low power may be used to operate a valve controlling fluids at relatively high pressure.

These objects are achieved by mounting a pilot valve element for reciprocation in the low pressure part of the valve body, arranged to cooperate with the end of the pilot passageway located at the front end of the piston, i.e., the low pressure end of the passageway. With this arrangement, in order to open the pilot passageway the pilot valve element need move only slightly away from the low pressure end of the piston in the same direction as the direction of fluid flow through the pilot passageway, and when the main valve piston moves off the main valve seat to open the valve, it moves in the opposite direction, i.e., opposite to the direction of flow through the pilot passageway. Thus, the extent of movement of the main piston is independent of the stroke of the pilot valve element and its actuating solenoid. Consequently, a solenoid whose core has a very short stroke may be employed to actuate the pilot valve and such a solenoid can involve a relatively low power consumption. In order to close the pilot passageway to initiate closing of the main valve, the pilot valve element would have to move through a distance greater than its stroke; however this movement is effected by means of a spring (or perhaps by gravity) and thus does not require a power input to the solenoid. Furthermore, since the solenoid assembly is located on the low pressure side of the main valve piston, it is completely isolated from the high pressure inlet fluid when the valve is closed. Therefore, no additional structure is required to shield the solenoid assembly from the high pressure fluid.

Other objects and advantages of the invention will be apparent from the following detailed description in which reference is made to the accompanying drawings.

In the drawings:

FIG. 1 is a schematic cross-sectional view of the valve in closed condition;

FIG. 2 is a similar view immediately after the pilot valve has been opened;

FIG. 3 is a similar view after the main valve has opened; and

FIG. 4 is a similar view showing the pilot valve closed to initiate the closing of the main valve.

The valve chosen to illustrate the present invention comprises a body 10 having an inlet port 11 and an outlet port 12. The inlet port 11 opens into a high pressure chamber 13, and the outlet port 12 opens into a low pressure chamber 14. Between the high and low pressure chambers 13 and 14 is an opening defining a valve seat 15 constituting the main valve seat of the valve. The valve seat 15 faces toward the high pressure chamber 13.

A main valve element 18, in the form of a piston in the present example, is adapted to seat against the valve seat 15 in order to close the valve, as indicated in FIG. 1. The front end or face of the piston 18 is so contoured that when it engages the valve seat 15 a narrow annular region 19 of the front face surrounds the valve seat. The valve piston 18 is slidably arranged within a cylinder 20 formed in the valve body 10. The rear portion of the valve piston 18 is provided with a bore which together with the cylinder 20 forms a chamber 21 behind the piston. The rear face 22 of the piston is open to the chamber 21, and a compression spring 23 within the chamber 21 urges the piston toward its seated position.

The piston 18 is provided with a bleed hole 26 through which high pressure fluid from the inlet port 11 may enter the chamber 21. Since the area of the rear face 22 of the piston is greater than the area of the annular region 19, the high pressure fluid in the chamber 21 serves to maintain the piston 18 seated against the valve seat 15. In order to permit the pressure within the chamber 21 to be relieved, the valve piston 18 is provided with a pilot passageway 27 extending between the front and rear faces of the piston. The cross-sectional area of the pilot passageway 27 is greater than the cross-sectional area of the bleed hole 26 so that when the pilot passageway is open the high pressure fluid will flow out of the chamber 21 faster than it flows into the chamber through the bleed hole 26.

The elements of the valve thus far described are well known, and no exclusive property in them is claimed.

Mounted on the valve body 10, in opposed relation to the front face of the valve piston 18, is a solenoid 28. The solenoid comprises a core tube 29 fixed to the body 10, a core 30 slidable within the core tube, a winding 31 surrounding the core tube, and a compression spring 34 urging the core 30 toward the valve piston 18. A pilot valve element or needle 35 projecting from the solenoid core 30 is arranged to slide longitudinally through the valve body 10 toward the valve piston 18. The free end of the pilot valve element is contoured to seat against the pilot valve seat 36 surrounding the end of the pilot passageway 27 at the front face of the valve piston 18.

The operation of the valve is as follows: When the valve is closed, as indicated in FIG. 1, high pressure fluid is present in the chamber 13, and no fluid or fluid under low pressure is present in the chamber 14. High pressure fluid is also present in the chamber 21 behind the valve piston, having entered through the bleed hole 26. The high pressure fluid acting against the rear face 22 of the piston serves, together with the force of the spring 23, to maintain the valve piston seated against the valve seat 15. This condition is opposed by the force of the high pressure fluid acting upon the annular region 19, but since the area of the face 22 is greater than the area of the region 19, the valve remains closed. In addition, the spring 34 of the solenoid maintains the pilot valve element 35 seated against the pilot valve seat 36.

When it is desired to open the valve, the solenoid winding 31 is energized (see FIG. 2) thus moving the core 30 in the direction which compresses the spring 34. As a result, the pilot valve element 35 is lifted off the pilot valve seat 36 whereupon the high pressure fluid in the chamber 21 rushes through the pilot passageway 27 into the low pressure region in the chamber 14. The pressure of the fluid within the chamber 21 is thus reduced, enabling the high pressure fluid acting on the annular region 19 to unseat the valve piston 18 as shown in FIG. 3. The valve piston 18 is maintained in the position of FIG. 3 by the pressure drop across the valve seat 15.

When it is desired to close the valve, the winding 31 is deenergized and the pilot valve element 35 seats once again on the pilot valve seat 36 under the influence of the spring 34. (See FIG. 4.) As a result of this closure of the pilot passageway 27, the pressure begins to build up within the chamber 21 thereby enabling the spring 23 to move the valve piston 18 against the main valve seat 15.

It will be seen that the direction in which the pilot valve element 35 moves to open the pilot passageway 27 is opposite to the direction in which the main valve element 18 moves to open the valve. Consequently, the solenoid core 30 and pilot element 35 need have only a very short stroke sufficient merely to open the pilot passageway 27. As soon as this occurs, the valve piston 18 moves away from the pilot valve element 35 to open the valve. In other words, the extent of movement of the valve piston 18 is independent of the stroke of the pilot valve element 35. Since the pilot valve element need have only a very short stroke, a low power solenoid may be employed to control the operation of the main valve element 18 even when relatively high fluid pressures are involved. This should be contrasted with conventional valves wherein the stroke of the solenoid core and pilot valve element must be greater than the extent of movement of the valve piston 18 in order to insure that the pilot passageway remains open as long as the solenoid is energized.

It will also be noticed that since the solenoid is located on the low pressure side of the valve seat 15 it is completely isolated from the high pressure fluid when the valve is closed. On the other hand, in conventional valves, the solenoid is located behind the valve piston 18 and chamber 21 and hence means must be provided for shielding the solenoid from the high pressure fluid in the chamber 21.

The invention has been shown and described in preferred form only and by way of example, and many variations may be made in the invention which will still be comprised within its spirit. It is understood, therefore, that the invention is not limited to any specific form or embodiment except insofar as such limitations are included in the appended claims.

What is claimed is:

1. In a valve of the character described, a valve body having adjacent high pressure and low pressure chambers with an opening between them, said opening defining a main valve seat on the high pressure side, a main valve element mounted on the high pressure side for movement toward and away from said main valve seat, said valve element having a front face adapted to engage said main valve seat and provided with an annular region surrounding the valve seat and exposed within the high pressure chamber of the valve, said valve element being provided on its rear side with a chamber communicating with said high pressure chamber through a bleed hole, a pilot passageway extending through said valve element from said rear chamber to said front face and terminating at said front face in a pilot valve seat facing the low pressure chamber of the valve, a pilot valve element independent of the main valve element and mounted on the low pressure side for movement toward and away from said pilot valve seat, and means for moving said pilot valve element, said pilot passageway being of larger cross-sectional area than that of said bleed hole so that when the pilot valve element is lifted off its seat to open said pilot passageway fluid will flow out of said rear chamber directly into the low pressure chamber of the valve at a rate faster than it flows into said rear chamber through said bleed hole whereby the fluid pressure on said annular region of said front face of the main valve element will be effective to lift said main valve element off its seat and thereby open the valve.

2. A valve according to claim 1 wherein said means for moving the pilot valve element is a solenoid which when energized moves said pilot valve element off said pilot valve seat, and a spring for returning said pilot valve element into seated condition against said pilot valve seat when said solenoid is deenergized.

References Cited in the file of this patent

UNITED STATES PATENTS

| | | |
|---|---|---|
| 2,624,542 | Ghormley | Jan. 6, 1953 |
| 2,815,921 | Bigelow | Dec. 10, 1957 |